July 1, 1930.  E. H. FREEMAN  1,768,553
ELECTRICALLY OPERATED FLOW METER
Original Filed Sept. 13, 1922
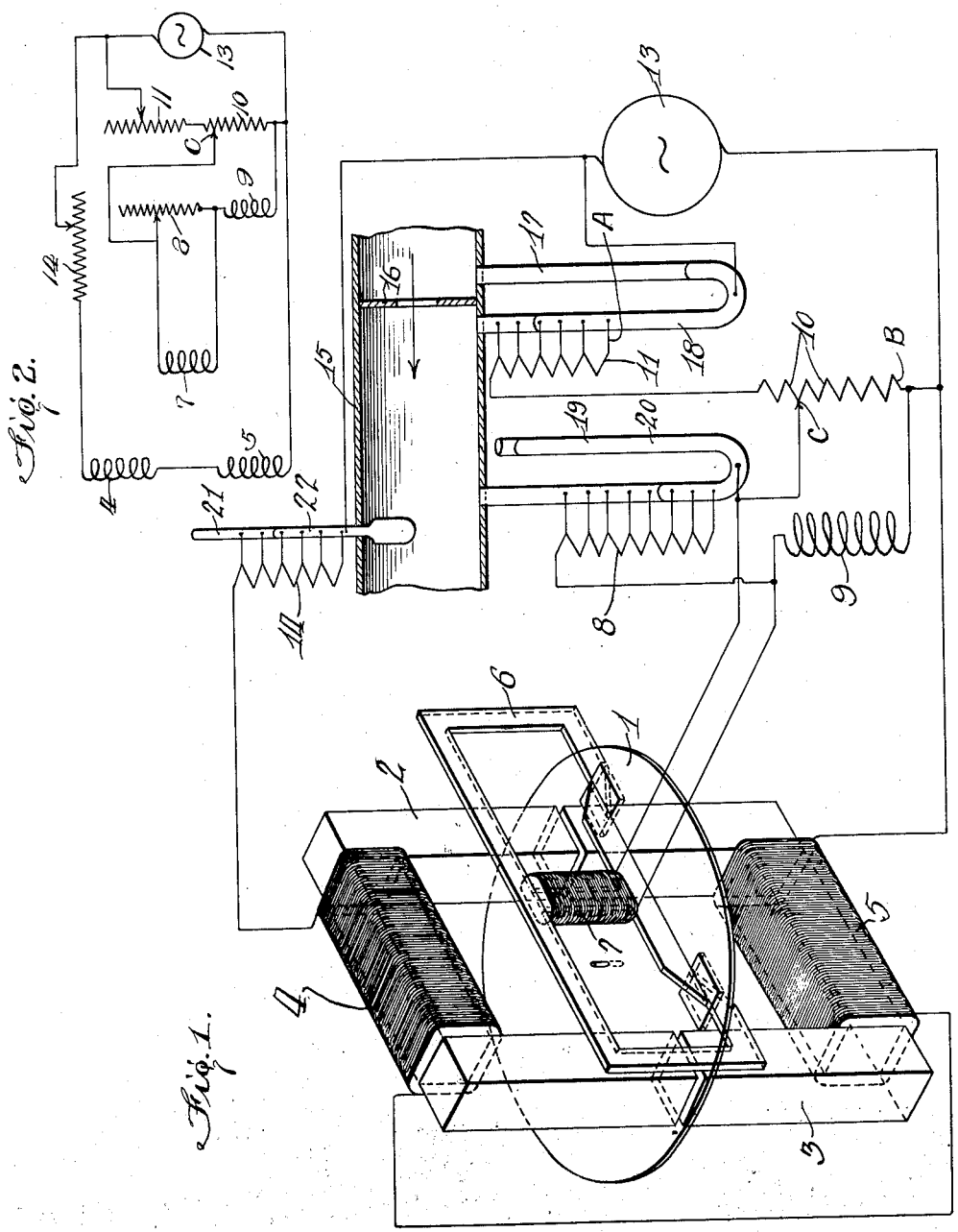

Patented July 1, 1930

1,768,553

UNITED STATES PATENT OFFICE

ERNEST H. FREEMAN, OF WILMETTE, ILLINOIS, ASSIGNOR TO REPUBLIC FLOW METERS CO., OF CHICAGO, ILLINOIS, A CORPORATION OF ILLINOIS

ELECTRICALLY-OPERATED FLOW METER

Application filed September 13, 1922, Serial No. 587,942. Renewed June 24, 1929.

The invention relates to certain features of an electrically operated flow meter whereby the indication of the meter is not only rendered substantially independent of the usual fluctuations in the voltage and in the frequency of the source of the electric energy by which the meter is operated, but is also automatically corrected for the effect of the pressure and the temperature of the fluid measured. Means are also shown by which a correction for specific gravity may be made. It is thus possible to obtain an accuracy in the indication which has not heretofore been possible with the type of meter used.

The invention is exemplified in the combination and arrangement of parts shown in the accompanying drawing and described in the following specification, and it is more particularly pointed out in the appended claims.

In the drawing—

Fig. 1 is a diagrammatic view showing one embodiment of the invention; and

Fig. 2 is a circuit diagram of the electrical connections of Fig. 1.

In Fig. 1 of the drawing, a disc 1 of conducting material is supported for rotation by a suitable frame, not shown, the supporting spindle for the disc being connected with any well-known form of counter for registering the amount of rotation of the disc for a period of time in the manner usual with integrating meters.

The rotatable disc 1 of conducting material is symmetrically placed between the poles of electro-magnets whose cores 2 and 3 are excited by alternating current through the windings 4 and 5 from the source 13, the resistor 14 being in series with these windings and the source. The windings 4 and 5 are so connected that the magnetic flux of the cores 2 and 3 passes mainly in a perpendicular direction through the disc 1.

A second electro-magnet has a core 6 excited by alternating current through the winding 7. The flux of this magnet passes perpendicularly through the disc 1 near the flux of the previously described magnet.

The flux set up by the magnet cores 2 and 3 reacts with the current induced in the disc 1 by the flux of the magnet core 6 and the flux of the magnet core 6 reacts with the current induced in the disc 1 by the flux of the cores 2 and 3 and since the fluxes of the two magnets are out of phase, as will be explained later, a torque is produced which rotates the discs. The relation of this accelerating torque, $T_a$, to the principal quantities upon which it depends is quite closely given by the following expression:

$$T_a \propto \phi_1 \phi_2 f \frac{\sin \theta \cos \beta}{Z}$$

in which $\phi_1$ = flux through cores 2 and 3,
$\phi_2$ = flux through core 6,
$f$ = frequency,
$\theta$ = phase angle between $\phi_1$ and $\phi_2$,
$\beta$ = phase angle between the E. M. F.'s induced in the disc and their corresponding currents,
$Z$ = impedance of the circuits in the disc.

As the disc rotates, it cuts across the two fluxes, $\phi_1$ and $\phi_2$, and currents are induced in the disc which oppose its motion. By construction, the flux $\phi_2$ is made so small in comparison with the flux $\phi_1$, that practically all of the retarding torque is due to motion through the flux $\phi_1$. The relation of this retarding torque, $T_r$, to the principal quantities upon which it depends is given by the following expression:

$$T_r \propto \omega \phi_1^2$$

in which $\omega$ = angular velocity
$\phi_1$ = flux through cores 2 and 3, as before.

For steady conditions, the disc will have such a speed that, neglecting friction, $$T_a = T_r$$

hence $$\omega \propto \frac{\phi_2 f \sin \theta \cos \beta}{\phi_1 Z}$$

An inspection of the circuits will show that the circuits in which the two magnet windings are placed receive their electro-motive force from the same source 13 so that a change in the voltage of the source 13, other things remaining constant, will change $\phi_1$ and $\phi_2$ substantially proportionately, and consequently the angular velocity is independent of the voltage of the source 13. This is practically true so long as the iron in the cores of the magnets is below magnetic saturation and the air gaps constitute nearly all of the reluctance in the magnetic circuits. Such independence of the voltage is a very desirable characteristic in an electrically operated flow meter since the flow which is to be measured by the meter has no connection with fluctuations in voltage that are produced by independent causes.

Similarly, the meter should be independent of the usual changes in frequency. This result has been attained by an arrangement of circuits shown in Figs. 1 and 2 and described below.

Two resistors, 10 and 11, are connected in series to the source 13. A reactor 9 and a resistor 8 are connected in series, the two being in parallel with the resistor 10. The reactance of 9 is several times greater than the resistance of 8 so that the impedance of 8 and 9 is nearly all due to the reactance of 9. This impedance is several times the resistance of 10. The winding 7 is connected in parallel with the resistance 8. The impedance of the winding 7 is nearly all reactance and is several times the resistance of 8.

The current through the reactor 9 will vary nearly inversely as the frequency, hence the drop over the resistor 8, which is the voltage applied to the winding 7, will vary nearly inversely as the frequency. But the current in the winding 7 varies directly as the voltage applied to it and nearly inversely as the frequency, hence this current, and therefore the flux varies inversely as the square of the frequency, approximately.

The windings 4 and 5 are highly reactive, being greater than the resistance of 14, so that the current in these windings, and therefore the flux $\phi_1$, varies nearly inversely as the frequency.

Substituting these relations between the fluxes and the frequency in the previously given expression for the angular velocity, which is $$\omega \propto \frac{\phi_2 \sin \theta \cos \beta}{\phi_1 Z}$$

gives $$\omega \propto \frac{\left(\frac{1}{f^2}\right) f \sin \theta \cos \beta}{\frac{1}{f} Z} \propto \frac{\sin \theta \cos \beta}{Z}$$

which shows that the angular velocity is independent of the frequency on the basis of the assumptions made except in so far as changes in the frequency may effect $\sin \theta \cos \beta / Z$. By so designing the circuits that the two fluxes are approximately in time quadrature for the average frequency of the source 13, the usual variations of frequency found in practice will have little effect on $\sin \theta$, $\cos \beta$, or Z, hence the indications of the meter are substantially independent of the ordinary changes in frequency found in light and power circuits.

There remain to be described the methods whereby the meter indicates the quantity of a flowing fluid corrected for the effects of pressure, temperature and specific gravity.

A pipe 15, shown in longitudinal section in Fig. 1, carries the fluid to be measured. This fluid passes through an orifice 16, or any other device producing a drop in pressure, in the direction of the arrow. A U-tube 17 containing the mercury 18 is connected on either side of the orifice 16 so that the pressure drop causes the mercury to rise on one side and short circuit more or less of the resistor 11. The combination is so designed that the conductance between the points A and B through the resistors 10 and 11 varies directly as the velocity of the fluid through the orifice 16.

The angular velocity of the disc 1 varies directly as this conductance and hence directly as the velocity of the fluid. The angular velocity of the disc, being independent of variations in voltage and frequency, is controlled substantially entirely by the characteristics in the circuits themselves which can be caused to vary according to changes in rate of flow and in other characteristics of the flowing fluid to be measured. One means of securing this result is shown diagrammatically by way of illustration.

A U-tube 19 containing the mercury 20 functions like a static pressure gage and causes the resistor 8 to be increased with an increase in the static pressure. Other types of pressure gages may be used similarly. A change in the resistance of 8 changes the speed of the disc 1 of the meter, hence it becomes possible to have the meter indicate automatically the quantity of a fluid, such as a gas, at some standard pressure while the measurement may be made at another pressure. If the pressure increases, more of the fluid will flow for a given velocity and the increase in the resistance 8 will result in a corresponding increase in the velocity of the disc.

A thermometer 21 containing the mercury 22 serves to modify the resistor 14 as the temperature of the fluid varies. Other types of thermometers may be used. A change in the resistance of 14 affects the speed of the disc 1 and the combination is so designed that the indication of the meter gives the quantity of the fluid at some standard temperature while the measurement may be made at another temperature.

The movable contact C on the resistor 10 can be moved so as to change the resistance between A and C. This change affects the speed of the meter and by this means its indication can be made correct for fluids of different densities.

It is to be understood that while certain resistances have been specified to take care of the effects of the variable factors velocity, pressure, temperature and specific gravity in measuring the flow of a fluid, there will be no departure from the spirit of the invention if some or all of these are interchanged. For example, the resistors 8 and 14 have been specified as taking care of changes in pressure and temperature respectively. It is possible to have the resistor 8 correct for temperature and the resistor 14 for pressure. Other combinations are also possible.

I claim:—

1. In combination, a meter having a rotating armature of conducting material, a main and a supplementary electro-magnet, the fields of which are traversed by said armature, the field of said main magnet being sufficiently strong to produce the predominating retarding force on said armature, circuits for said magnets differing from each other to cause the fields of said magnets to be out of step with each other, a common source for supplying alternating electromotive force to said circuits, impedance in each of said circuits, and means for applying variable portions of the total electromotive force of said source to one of said circuits to produce variations in the speed of said armature depending upon the electromotive force applied, said last-named means comprising a resistor in series with said source and in parallel with one of said electro-magnets, and means responsive to a variable for changing the current in said resistor.

2. In combination, a meter having a main and a supplementary electro-magnet, an armature arranged to rotate in the fields of said magnets, the field of said main magnet being of sufficient strength to exert the predominating retarding force on said armature, a common source of alternating electromotive force for said magnets, the circuits of said magnets differing from each other to cause said fields to be out of step with each other, and means controlled by a variable quantity to be measured for applying variable proportions of the electromotive force to said supplementary magnet, said means comprising a pair of resistors in series with said source, one of said resistors being in parallel with said supplementary magnets, and means for varying the other of said resistors commensurately with changes in said variable quantity.

3. In combination, a meter having a main and a supplementary electro-magnet, an armature arranged to rotate in the field of said magnets, circuits for said magnets differing from each other to cause the fields of said magnets to be out of step with each other, a common source of alternating electromotive force for said circuits, the field of one of said magnets being of sufficient strength to predominate the retarding force exerted on said armature when said armature is rotated, inductance in the circuit of said supplementary magnet in addition to and in series with the inductive windings of said magnet, a resistor in parallel with said additional inductance, and means controlled by a quantity to be measured for varying the portion of the total electro-motive force of said source that is applied to the circuit of said supplementary magnet.

4. The combination with a meter having a main and a supplementary magnet, the field strength of said main magnet being many times that of said supplementary magnet, an armature arranged to rotate in the fields of said magnets, a common source of alternating electromotive force for energizing said magnets, a circuit connecting said main magnet with said source, a pair of resistors in series with said source, a reactor and a resistor connected in series with each other and in parallel with one of said first-named resistors, the winding of said supplementary magnet being arranged in parallel with the resistor in series with said reactor, the circuits of said magnets differing from each other to cause the fields of said magnets to be out of step with each other.

5. The combination with a meter having a pair of magnets, an armature arranged to rotate in the fields of said magnets, the field of one of said magnets being sufficiently strong to predominate the retarding force exerted on said magnet, a common source of alternating electromotive force connected with said magnets for energizing said magnets, a pair of resistors connected in series with said source of electromotive force, a third resistor and a reactor in series with each other and in parallel with one of said first-named resistors, and means controlled by a quantity to be measured for varying the resistance of the other of said first-named resistors, the winding of one of said magnets being connected in parallel with said third-named resistor.

6. The combination with a meter having a pair of electro-magnets and an armature arranged to rotate in the fields of said magnets, the field of one of said magnets being sufficiently great to predominate the retarding force exerted on said armature when said armature is rotated, a common source of alternating electromotive force for energizing said magnets, one of said magnets being connected in circuit with said source, a pair of resistors in series with said source, the other of said magnets being connected in parallel with one of said resistors, means controlled by a quantity to be measured for varying the resistance of the other of said resistors, a third resistor in parallel with said last-named magnet. and a reactor in series with said third resistor and last-named magnet, the impedance of said reactor being several times that of said third-named resistor.

7. The combination with a meter having a main and a supplementary magnet and an armature arranged to rotate in the fields of said magnets, the field of one of said magnets being sufficiently strong to predominate the retarding force on said armature, a common source of alternating electromotive force for energizing said magnets, said main magnet being in circuit with said source, a pair of resistors in series with said source, means controlled by differential pressure produced by the flow of a fluid for varying one of said resistors, said supplementary magnet being connected in parallel with the other of said resistors, a third resistor, means controlled by the static pressure of said fluid for varying said third resistor, and a reactor in series with said supplementary magnet and third resistor, the impedance of said reactor being several times as great as that of said third resistor and also several times as great as the resistor with which said supplementary magnet is connected in parallel.

8. The combination with a meter having a main and a supplementary magnet, of an armature arranged to rotate in the fields of said magnets, the field of said main magnet being sufficiently great to predominate the retarding force exerted on said armature, a common source of alternating electromotive force for energizing said magnets, said main magnet being in circuit with said source, a pair of resistors in series with said source, means controlled by differential pressure produced by the flow of a fluid for varying one of said resistors, means for connecting said supplementary magnet in parallel with the other of said resistors, a third resistor in parallel with said supplementary magnet, a reactor in series with said third resistor and said supplementary magnet, the impedance of said reactor being several times as great as that of said third resistor and also several times as great as that of the resistor in parallel with which said supplementary magnet is connected, means controlled by the static pressure of said fluid for varying said third resistor, a fourth resistor in series with said main magnet, and means controlled by the temperature of said fluid for varying said fourth resistor.

9. The combination with a meter having a pair of electro-magnets and an armature arranged to revolve in the fields of said magnets, of a common source of alternating electromotive force for energizing said magnets, the cores of said magnets being worked below the saturation point while the fields of one of said magnets is sufficiently strong to substantially predominate the retarding force exerted on said armature when said armature is rotated, and means controlled by a quantity to be measured for varying the current flowing in one of said magnets to vary the speed of rotation of said armature, supplementary inductance in series with the weaker of said magnets, and a variable resistance in parallel with said supplementary inductance.

10. The combination with a meter having a pair of electro-magnets and an armature arranged to rotate in the fields of said magnets, of a common source of electromotive force for energizing said magnets, the cores of said magnets being worked below the saturation point and one of said magnets exerting the dominating retarding force on said armature, said latter magnet being in circuit with said source of electro-motive force, a resistor in parallel with the other of said magnets, a highly inductive reactor in series with said resistor and magnet, a second resistor in series with said source of electromotive force and in parallel with said reactor and first-named resistor, and means controlled by a quantity to be measured for varying the current in said last-named magnet.

11. In combination, a meter comprising a main and a supplementary magnet and an armature arranged to rotate in the fields of said magnets, the fields of said magnets being out of step with each other, a common source of alternating electromotive force for energizing said magnets, said magnets being worked below the point of saturation while the field of said main magnet is of sufficient strength to produce substantially the entire retarding force exerted on said armature when rotated, a first and a second resistor in series with said source of electromotive force, a third resistor and a reactor in parallel with said second resistor, said third resistor being in parallel with said supplementary magnet, and means controlled by a quantity to be measured for varying one of said resistors.

12. The combination with an integrating meter having a rotating conductor member and main and supplementary electro-magnets, the fields of which traverse said conductor member and thereby produce rotation of said member, the field of said main magnet being of sufficient strength to produce substantially the entire retarding force exerted on said conductor member when rotated, said magnets forming parts of separate circuits different from each other sufficiently so as to cause the fields of said circuits to be out of step with each other, a common source of alternating electro-magnetic force for said circuits, the impedance of said circuits being sufficiently great to prevent saturation of the cores of said magnets for the electro-motive force used, means for varying the ratio of voltage to impedance in one of said circuits to effect change in the speed of said conductor member to thus provide a measure of the amount of operation of said ratio varying means, supplementary inductance in series in said last-mentioned circuit, and a variable resistance in parallel with said supplementary inductance for overcoming the effect of change in frequency of said source.

13. A meter comprising in combination, a main and a supplementary magnet, an armature arranged to rotate in the fields of said magnets, the fields of said magnets being out of step with each other, circuits for said magnets, a common source of alternating electromotive force for energizing said magnets, means for varying the impedance in one of said circuits to effect change in the speed of said armature, thus providing a measure of the amount of opertion of said impedance varying means, and means for varying the strength of said supplementary magnet without causing an appreciable change in said impendance.

14. The combination with a meter having a main and a supplementary magnet and an armature arranged to rotate in the fields of said magnets, the fields of said magnets being out of step with each other, circuits for said magnets, a common source of alternating electro-motive force for energizing said magnets, means for varying the impedance in one of said circuits to effect change in the speed of said armature, thus providing a measure of the amount of operation of said impedance varying means, and means controlled by a characteristic of a fluid being measured for varying the strength of said supplementary magnet without causing an appreciable change in said impedance.

15. The combination with a meter having a main and a supplementary magnet and an armature arranged to rotate in the fields of said magnets, the fields of said magnets being out of step with each other, circuits for said magnets, a common source of alternating electro-motive force for energizing said magnets, means for varying the impedance in one of said circuits to effect change in the speed of said armature, thus providing a measure of the amount of operation of said impedance varying means, and means responsive to temperature variations for varying the strength of said supplementary magnet without causing an appreciable change in said impedance.

16. The combination with a meter having a main and a supplementary magnet and an armature arranged to rotate in the fields of said magnets, the fields of said magnets being out of step with each other, circuits for said magnets, a common source of alternating electro-motive force for energizing said magnets, means for varying the impedance in one of said circuits to effect change in the speed of said armature, thus providing a measure of the amount of operation of said impedance varying means, and means controlled by any characteristic of a fluid being measured and by the static pressure of said flowing fluid for varying the strength of said supplementary magnet without causing an appreciable change in said impedance.

17. The combination with a meter having a main and a supplementary magnet and an armature arranged to rotate in the fields of said magnet, the fields of said magnet being out of step with each other, circuits for said magnets, a common source of alternating electro-motive force for energizing said magnets, means for varying the impedance in one of said circuits to effect change in the speed of said armature, thus providing a measure of the amount of operation of said impedance varying means, and means controlled by any characteristic of a fluid being measured and by the temperature of said flowing fluid for varying the strength of said supplementary magnet without causing an appreciable change in said impedance.

18. The combination with a meter having a main and a supplementary magnet and an armature arranged to rotate in the fields of said magnets, the fields of said magnets being out of step with each other, circuits for said magnets, a common source of alternating electro-motive force for energizing said magnets, means for varying the impedance in one of said circuits to effect change in the speed of said armature, thus providing a measure of the amount of operation of said impedance varying means, and means controlled by the static pressure and by the temperature of flowing fluid for varying the strength of said supplementary magnet without causing an appreciable change in said impedance.

19. The combination with a meter having a main and a supplementary magnet and an armature arranged to rotate in the fields of said magnets, the fields of said magnets being out of step with each other, circuits for said magnets, a common source of alternating electro-motive force for energizing said magnets, means for varying the impedance in one of said circuits to effect change in the speed of said armature, thus providing a measure of the amount of operation of said impedance varying means, and means controlled by any characteristic of a fluid being measured, the static pressure and by the temperature of said flowing fluid for varying the strength of said supplementary magnet without causing an appreciable change in said impedance.

In testimony whereof I have signed my name to this specification on this 11th day of September, A. D. 1922.

ERNEST H. FREEMAN.